United States Patent Office 3,336,252
Patented Aug. 15, 1967

3,336,252
PRODUCTION OF MOLDING MATERIALS OF BITUMEN AND POLYOLEFINS
Ludwig Raichle and Leo Unterstenhoefer, Limburgerhof, Pfalz, and Hans Georg Trieschmann, Hambach, Weinstrasse, Germany, assignors to Badische Anilin- & Soda-Fabrik Aktiengesellschaft, Ludwigshafen am Rhine, Rhineland, Pfalz, Germany
No Drawing. Filed Oct. 24, 1963, Ser. No. 318,491
Claims priority, application Germany, Oct. 31, 1962, B 69,427
5 Claims. (Cl. 260—28.5)

This invention relates to a process for the production of molding materials from bitumen and monoolefin polymers.

It is known that bitumen can be homogeneously mixed in a wide range of concentration with polyolefins, particularly polyethylene. The molding materials may be used for example for coating metal surfaces to protect them from corrosion or as pourable sealing compounds. The mixtures may however also be used as the binding agent in molding materials which usually comprise a predominant proportion of coarse grained mineral fillers. Such molding materials may be used for example for the production of pipes and road surfaces.

The preparation of molding materials from bitumen and polyolefins is at present generally carried out in small batches at the place where they are to be used either by stirring the solid polyolefin into the molten bitumen or by stirring solid or molten bitumen into the molten polyolefin. It is also known to add to bitumen a solution of polyethylene and then to evaporate the solvent. These prior art methods are however too protracted and expensive for large scale production of mixtures of bitumen and polyolefins, particularly when starting from solidified bitumen.

The object of this invention is to provide a process for the particularly rapid production of molding materials from bitumen and monoolefin polymers. Another object of this invention is to provide a process for the production of molding materials from bitumen and monoolefin polymers which can be directly combined with the recovery of bitumen from petroleum. Other objects of the invention will be evident from the following description.

The said objects are achieved according to this invention with advantage by extruding molten olefin polymer in the form of thin strands into a stream of molten bitumen (having a penetration of at least 45) in the direction of the bitumen flow. Bitumen having a penetration appreciably less than 45 is unsuitable for the process. Unblown bitumen is preferred for the process. Suitable bitumen usually has a penetration between 45 and 200.

By penetration we mean the depth of penetration of a standard needle (in one-tenth mm.) into bitumen at 25° C. and a load of 100 g. during five seconds according to DIN 1995. The standard needle consists of a cylindrical steel wire 51 mm. in length and 1.00 to 1.02 mm. in diameter. The steel wire is pointed at one end to a uniform cone 6.35 mm. in height and having an angle of 8°40′ to 9°40′. The apex of the cone is ground flat until it has a surface having a diameter of 0.14 to 0.16 mm.

The olefin polymers for the process may be not only polyethylenes prepared by the conventional high pressure and low pressure polymerization methods, which are preferred, but also polypropylene, polyisobutylene and copolymers of ethylene with propylene, butene-1 or other ethylenically unsaturated monomers, such as particularly vinyl acetate, vinyl propionate and/or acrylic esters of alkanols having one to four carbon atoms. When polyethylene is used, its melt index should in general be between 5 and 30 and preferably between 10 and 20, but polyethylenes having higher or lower melt indices may also be used. Melt indices given in the present specification are determined according to ASTM D 1238–57 T. The process is particularly interesting for polyethylenes having a density of 0.916 to 0.940 and copolymers of 95 to 70% by weight of ethylene with 5 to 30% by weight of vinyl acetate and/or ethyl acrylate and/or propylene, which have a melt index of 10 to 20.

The temperature of the molten bitumen should in general be between 150° and 250° C., preferably between 190° and 250° C. for the process. The temperature of the olefin polymer at extrusion is preferably between 200° and 250° C., but it may also be less than 200° C., for example at 180° C. During the process the olefin polymer is extruded through jets into the stream of molten bitumen, the jets usually having a diameter of 0.5 to 5 mm., preferably 0.5 to 2 mm. In general 2 to 20, preferably 5 to 10 jets are used per kg. per hour of olefin polymer or mixture of olefin polymer and mineral filler to be extruded, the diameter of the jets being smaller the larger the number of jets chosen. The thin strands of olefin polymer should not contact downstream of the jets in the direction of flow of the bitumen, and the stream of bitumen downstream of the jet preferably exhibits laminar flow or at the most only slightly turbulent flow. The stream of bitumen is advantageously contained in a tube and supplied direct from the bottom discharge of the evaporator used for the production of bitumen from petroleum. In carrying out the process in practice, a plurality of jets may be provided for extrusion of the olefin polymer in a cross-section of the tube used for conducting the bitumen. It is also possible however to arrange a plurality of jets spaced apart successively at suitable distances in the direction of flow of the bitumen. It is also possible, and particularly advantageous for the production of molding materials having a high content of olefin polymer, to provide a plurality of jets in each of two or more successive cross-sections spaced apart by suitable distances in the direction of flow of the bitumen. In order to dissolve in the molten bitumen, the strands of the olefin polymer should remain positioned in parallel or substantially parallel relationship in the stream of bitumen for an adequate time which may amount to about 0.5 to 15 seconds or even 25 seconds. Particularly rapid dissolution of the olefin polymer in the bitumen can also be achieved by providing, downstream of the jets through which the polyolefine is extruded, mixing nozzles in which an increased rate of flow prevails. The rate of flow of the molten bitumen in the process may be varied within wide limits and is preferably 0.3 to 1.5 m./sec. After a zone for the dissolution of the olefin polymer immediately following the extrusion of the olefin polymer, the said zone in general having a length of 0.3 to 1.5 m., the mixture may advantageously be homogenized in a mixing zone in which increased turbulence prevails, for example by mixing pumps or high speed impellers. Such impellers may advantageously be located in the pipe bends of the pipes provided for the stream of bitumen. It is also of advantage in the process to direct the stream of bitumen perpendicularly upward.

It is particularly advantageous to use in the process olefin polymers, for example polyethylene, which contain 5 to 30% by weight (with reference to the olefin polymer) of finely divided mineral filler. The granule size of this filler is preferably 0.01 to 90 microns. Particularly suitable mineral fillers are ground shale, quartz powder, clays and finely divided minerals, such as feldspar. If such fillers are used in the process, the thin strands of olefin polymer surprisingly dissolve particularly rapidly in the stream of bitumen and relatively short zones may be provided for dissolution of the olefin polymer in the bitumen. Moreover when large amounts of filler are incorporated, it is not necessary that the stream of bitumen should exhibit laminar flow immediately following the jets provided for the extrusion of the olefin polymer. In this case, for example stirrers for mixing the stream of bitumen with the olefin polymer may be provided at a short distance and if desired at less than 1 to 2 meters from these jets. Molding materials of bitumen and olefin polymers which contain such fillers may be granulated by conventional methods immediately after their production, by extruding them through jets in the form of thin strands in the molten condition, for example using gear or piston pumps, and then breaking up the strands in conventional granulating machines, preferably after cooling with water.

The granulated molding materials of olefin polymers, bitumen and mineral fillers practically do not stick and can therefore be transported and processed particularly easily. For example they may readily be metered into coarse-particled mineral additives which have been heated to about 250° C. They may also be advantageously melted in layers in heated molds. Molded articles free from air bubbles, for example, may be prepared from the granulates in this way.

In particular cases, concentrates of olefin polymers in bitumen, which may also contain mineral fillers, may be used with advantage instead of olefin polymers.

The invention is further illustrated in the following Examples in which the parts specified are parts by weight.

*Example 1*

A mixture of 10 parts of mineral filler and 20 parts of high-pressure polyethylene having a density of 0.918 g./ccm. and a melt index of 20 is extruded through a jet having a diameter of 1.5 mm. into a stream of bitumen having a penetration of 80 and a softening point of 52° C. (ring and ball, DIN 1995). The stream of bitumen is flowing in a tube, is at a temperature of 190° C. and flows at a rate of 0.3 m./sec. 70 parts per hour of bitumen flow through the tube, and 30 parts per hour of the said mixture is extruded through the jet. The jet is mounted in the tube so that the mixture of polyethylene and mineral filler is extruded in the direction of flow of the bitumen. The speed of the strand issuing from the jet is about 0.2 m./sec. The mineral filler used is ground slate having a grain size of 0.01 to 90 microns. The polyethylene dissolves in the bitumen within about seven seconds. The mixture of polyethylene, bitumen and mineral filler is then granulated in a conventional way.

*Example 2*

Polypropylene having a density of 0.905 g./ccm. and a melt index of 10 is extruded through jets having a diameter of 3 mm. into a stream of bitumen having a penetration of 35 to 50 and a softening point of 54° to 59° (ring and ball). The stream of bitumen flows in a tube, has a temperature of 190° C. and a rate of flow of 0.5 m./sec. 60 parts of bitumen flows through the tube per hour and 40 parts of polypropylene is extruded per hour through the jets in the direction of flow of the bitumen. The rate at which the polypropylene strands issue from the jets is about 0.4 m./sec. 8 jets are used for the extrusion for each kg. of polypropylene extruded per hour. The polypropylene dissolves in the bitumen within twenty seconds. The mixture of bitumen and polypropylene is then granulated in the usual way.

*Example 3*

Atactic polypropylene having a density of 0.9 g./ccm. and a melt index of 25 is extruded through jets having a diameter of 5 mm. into a stream of bitumen having a penetration of 70 to 100 and a softening point of 44° to 49° C. (ring and ball). Five jets are used for the extrusion of every kg. of polypropylene extruded per hour. The stream of bitumen flows in a tube, has a temperature of 180° C. and a rate of flow at 1.5 m./sec. 50 parts of bitumen flow through the tube per hour, and 50 parts of atactic polypropylene per hour are extruded through the jets in the direction of flow of the bitumen. The rate at which the filaments issue from the jets is about 1.4 m./sec. The atactic polypropylene dissolves in the bitumen within twenty seconds. The mixture of bitumen and atactic polypropylene obtained in this way is then granulated by a conventional method.

*Example 4*

A mixture of 30 parts of polypropylene and 10 parts of ground slate having a maximum particle diameter of 90 microns is extruded through jets having a diameter of 1.5 mm. into a stream of bitumen having a penetration of 160 to 210 and a softening point of 37° to 44° C. (ring and ball). The polypropylene has a density of 0.903 g./ccm. and a melt index of 10. The stream of bitumen flows at a flow rate of 0.7 m./sec. in a tube and has a temperature of 190° C. 60 parts of bitumen flow through the tube per hour and 40 parts of the mixture of polypropylene and ground slate are extruded per hour through the jets in the direction of flow of the bitumen. Nine jets are used for the extrusion of each kg. of the mixture of polypropylene and ground slate extruded per hour. The rate at which the filaments issue from the jets is about 0.6 m./sec. The polypropylene dissolves in the bitumen within fifteen seconds. The mixture of bitumen, polypropylene and ground slate is then granulated in the usual way.

*Example 5*

A mixture of 30 parts of ground slate having a maximum particle diameter of 90 microns and 20 parts of atactic polypropylene having a density of 0.9 g./ccm. and a melt index of 25 is extruded through jets having a diameter of 2.5 mm. into a stream of bitumen having a penetration of 50 to 70 and a softening point of 49° to 54° C. (ring and ball). The stream of bitumen flows at a flow rate of 1.2 m./sec. through a tube and has a temperature of 180° C. 50 parts of bitumen flow through the tube per hour, and 50 parts of the mixture of polypropylene and ground slate are extruded per hour through the jets in the direction of flow of the bitumen. Seven jets are used for the extrusion of each kg. of the mixture of ground slate and polypropylene extruded per hour. The rate at which the filaments issue from the jets is about 1.1 m./sec. The atactic polypropylene dissolves in the bitumen in about ten seconds. The mixture of bitumen, atactic polypropylene and ground slate is then granulated.

*Example 6*

A copolymer of 75% by weight of ethylene and 25% by weight of propylene which has a density of 0.9 g./ccm. and a melt index of 20 is extruded through jets having a diameter of 4 mm. into a stream of bitumen having a penetration of 35 to 50 and a softening point of 54° to 59° C. (ring and ball). The stream of bitumen flows through a tube, has a temperature of 200° C. and a rate of flow of 1.5 m./sec. 70 parts of bitumen flow through the tube per hour, and 30 parts of copolymer per hour are extruded through the jets in the direction of flow of the bitumen. Five jets are used for the extrusion of each kg. of copolymer extruded per hour. The rate of flow of the filaments issuing from the jets is 1.4 m./sec. The copolymer dissolves in the bitumen in ten seconds. The mixture of bitumen and ethylene-propylene copolymer obtained is then extruded in the conventional way and processed into shaped articles.

*Example 7*

An ethylene copolymer having a density of 0.93 g./ccm. and a melt index of 25 is extruded through jets having a diameter of 2 mm. into a stream of bitumen having a penetration of 70 to 100 and a softening point of 44° to 49° C. (ring and ball). The ethylene copolymer contains 25% by weight of vinyl acetate in polymerized form. The stream of bitumen flows through a tube, has a temperature of 190° C. and a rate of flow of 1.5 m./sec. 60 parts of bitumen flow through the tube per hour, and 40 parts of the copolymer are extruded per hour through the jets in the direction of flow of the bitumen, through eight jets for each kg. of copolymer per hour. The rate of the filaments issuing from the jets is about 1.4 m./sec. The copolymer dissolves in about ten seconds in the bitumen. The mixture of bitumen and ethylene copolymer is then granulated by a conventional method.

*Example 8*

A mixture of 35 parts of ground slate having a maximum particle diameter of 90 microns and 15 parts of ethylene copolymer having a density of 0.93 g./ccm. and a melt index of 25 is extruded through jets having a diameter of 3 mm. into a stream of bitumen having a penetration of 160 to 210 and a softening point of 37° to 44° C. (ring and ball). The ethylene copolymer contains 25% of vinyl acetate in polymerized form. The stream of bitumen flows through a tube, has a temperature of 200° C. and a rate of flow of 0.5 m./sec. 50 parts of bitumen flow through the tube per hour and 50 parts per hour of the mixture of ground slate and copolymer are extruded through the jets in the direction of flow of the bitumen. Eight jets are used for the extrusion of each kg. of extruded mixture of ground slate and copolymer per hour. The rate of flow of the filaments issuing from the jets is 0.4 m./sec. The copolymer dissolves in the bitumen in fifteen seconds. The mixture of bitumen, copolymer and ground slate is then granulated in the usual way.

*Example 9*

Polyethylene having a density of 0.96 g./ccm. and a melt index of 5 is extruded through jets having a diameter of 0.5 mm. into a stream of bitumen having a penetration of 160 to 210 and a softening point of 37° to 44° C. (ring and ball). The stream of bitumen flows through a tube, has a temperature of 210° C. and a rate of 0.5 m./sec. 80 parts of bitumen flow through the tube per hour and 20 parts of polyethylene per hour are extruded through the jets in the direction of flow of the bitumen. Ten jets are used for the extrusion of each kg. of polyethylene to be extruded per hour. The rate of the polyethylene strands issuing from the jets is about 0.4 m./sec. The polyethylene dissolves in the bitumen in twenty seconds. The mixture of bitumen and polyethylene is then granulated.

We claim:

1. A process for production of molding materials from bitumen and olefin polymers which comprises forming a stream of molten bitumen flowing at laminar flow with at most slight turbulence at a flow velocity of 0.3 to 1.5 meters per second and having a temperature of 150–250° C., extruding into said laminar stream, in the direction of flow of said bitumen, strands of a molten olefin polymer selected from the group consisting of polyethylene, polypropylene, polyisobutylene, and an interpolymer of ethylene with at least one member selected from the group consisting of propylene, butene-1, vinyl acetate, vinyl propionate, and acrylic esters of alkanols having 1–4 carbon atoms, said interpolymers containing 70–95% by weight of ethylene, said molten polymer having an extrusion temperature of 180–250° C., said molten polymer further having distributed therein 5–30% by weight, based on the molten polymer, of finely divided particles of mineral filler of particle sizes in the range of 0.01 to 90 microns, said particles accelerating the rate of dissolving of said polymer in said bitumen, and flowing said stream of molten bitumen and said strands in substantially parallel flow in a primary dissolving zone for at least 0.5 second and a distance of at least 0.3 meter to dissolve said polymer in said bitumen.

2. A process as claimed in claim 1 wherein said molten polymer strands are extruded through jets having a diameter 0.5 to 5 mm.

3. A process as claimed in claim 2 wherein said jets number 2–20 jets per kilogram per hour of extruded material.

4. A process as claimed in claim 1, and homogenizing the dissolved polymer and bitumen in a turbulent mixing zone following said primary dissolving zone.

5. A process as claimed in claim 1 wherein said bitumen has a penetration of 45 to 200, said penetration being the depth of penetration in units of 0.1 mm. by a standard needle at a loading of 100 grams in five seconds into bitumen at 25° C., said standard needle consisting of a cylindrical steel wire 51 mm. in length and 1.00 to 1.02 mm. in diameter with a pointed tip formed by a cone 6.35 mm. in height with an angle of slope of 8°40' to 9°40' and the apex of the cone being ground flat and having a flat tip of 0.14 to 0.16 mm. diameter.

References Cited

UNITED STATES PATENTS

| | | | |
|---|---|---|---|
| 2,540,146 | 2/1951 | Stober | 260—34.2 |
| 2,639,275 | 5/1953 | Vickers et al. | 260—34.2 |
| 2,834,742 | 5/1958 | Scott et al. | |
| 3,249,567 | 5/1966 | Vigneault. | |
| 3,275,731 | 9/1966 | Kosinsky | 264—349 |

MORRIS LIEBMAN, *Primary Examiner.*

B. A. AMERNICK, *Assistant Examiner.*